United States Patent
Morris et al.

(10) Patent No.: US 12,050,518 B2
(45) Date of Patent: Jul. 30, 2024

(54) STORING AND RESTORING USER ACCOUNT DATA BACKUPS ACROSS ONLINE PLATFORMS

(71) Applicant: Dropbox, Inc., San Francisco, CA (US)

(72) Inventors: Nicholas Morris, New York, NY (US); Sourabh Yerfule, Sunnyvale, CA (US); Parker Timmerman, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 93 days.

(21) Appl. No.: 18/064,495

(22) Filed: Dec. 12, 2022

(65) Prior Publication Data

US 2024/0193043 A1 Jun. 13, 2024

(51) Int. Cl.
G06F 11/14 (2006.01)

(52) U.S. Cl.
CPC ...... G06F 11/1448 (2013.01); G06F 11/1469 (2013.01)

(58) Field of Classification Search
CPC ............. G06F 11/1451; G06F 11/1469; G06F 11/1448
See application file for complete search history.

(56) References Cited

U.S. PATENT DOCUMENTS

| | | | |
|---|---|---|---|
| 10,198,589 B2 | 2/2019 | Kumar et al. | |
| 10,942,818 B1 | 3/2021 | Bhange et al. | |
| 10,992,747 B2 | 4/2021 | Bolotin et al. | |
| 11,237,911 B2 | 2/2022 | Hempelmann et al. | |
| 11,327,846 B2 | 5/2022 | Kumar et al. | |
| 2006/0026171 A1* | 2/2006 | Savage | G06F 16/21 |
| 2016/0196218 A1 | 7/2016 | Kumar et al. | |
| 2019/0068611 A1* | 2/2019 | Kopf | H04L 67/1097 |

FOREIGN PATENT DOCUMENTS

WO 2017212499 A1 12/2017

OTHER PUBLICATIONS

Daryabar F., et al., "Forensic investigation of OneDrive, Box, GoogleDrive and Dropbox Applications on Android and iOS Devices," Australian Journal of Forensic Sciences, vol. 48, No. 6, 2016, pp. 615-642.

* cited by examiner

*Primary Examiner* — Jane W Benner
(74) *Attorney, Agent, or Firm* — Keller Preece PLLC

(57) ABSTRACT

The present disclosure is directed toward systems, methods, and non-transitory computer-readable media for generating, managing, and restoring data backups for user account data at network-based third-party systems. For example, the disclosed systems generate data backups within a content management system to store user account data from third-party systems such as social media systems, photo library systems, video sharing systems, and others. In some cases, the disclosed systems detect changes to data a third-party system and further updates a stored data backup corresponding to the third-party system based on the detected changes.

20 Claims, 12 Drawing Sheets

STORING AND RESTORING USER ACCOUNT DATA BACKUPS ACROSS ONLINE PLATFORMS

BACKGROUND

Advancements in computing devices and networking technology have given rise to a variety of innovations in cloud-based digital content storage and sharing. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of flexibility, efficiency, and data security.

As just suggested, certain existing digital content systems are inflexible. More particularly, when performing data backups, existing systems are often platform-specific and are therefore fixed to their specific data environment, such as an email client or a photo library. To elaborate, backing up data in existing systems frequently requires internal mechanisms that are native to, and/or hosted by, the same system that stores the data to be backed up. Consequently, existing systems can perform data backups of user account data within their respective environments, but they cannot flexibly adapt for cross-platform compatibility to back up data external to their data environments.

Due at least in part to their inflexibility, some existing digital content systems are inefficient. More specifically, certain existing systems waste computing resources such as processing power, memory, and network bandwidth by forcing computing devices and data networks to back up data using many different platform-specific systems for each user. These days, users often use a wide range of online platforms for different tasks in a single day, such as email clients, photo libraries, and social media platforms. For even a single user, each of these online platforms stores and maintains its own data for a respective user account associated with the user. To back up such data, these existing systems often host their own data backup mechanisms independently from one another, consuming large amounts of computer storage, processing power, and network bandwidth as even a single user backs up data across numerous online accounts.

Additionally, existing systems often provide inefficient user interfaces that require excessive numbers of user interactions to access desired data and/or functionality. For example, because existing systems are platform-specific and back up respective portions of user data within their own environments, these systems often require their own computer applications and interfaces for accessing and managing the user data. As a result, such systems waste computing resources in processing the excessive numbers of user interactions for navigating through the many layers of applications and interfaces to access and manage each set of platform-specific data for a given user.

In addition to their inefficiencies, some existing digital content systems are also insecure. In particular, existing systems are often susceptible to account takeovers by malicious actors or ransomware. Indeed, the platform-specific nature of existing systems compromises user account data by ensuring that a user account must be admitted to manage the user account data within the platform or environment. Thus, if an account takeover takes place and a user cannot access their account, the system has no means by which to secure the user account data or provide access to the user. Without more secure data management, such existing systems therefore risk losing or corrupting user account data.

SUMMARY

This disclosure describes one or more embodiments of systems, methods, and non-transitory computer-readable storage media that provide benefits and/or solve one or more of the foregoing and other problems in the art. For instance, the disclosed systems provide a new system for backing up user account data across online platforms. In some embodiments, the disclosed systems leverage a cloud-based, platform-agnostic data storage to back up and store user account data from a number of online systems, including email clients, photo libraries, video sharing systems, and social media platforms. For example, the disclosed systems can integrate with these third-party systems to intelligently perform data backups of all or some of the user account data according to various parameters. In some cases, the disclosed systems can detect (or receive indications of) changes or modifications to user account data within one or more third-party systems and can further update a data backup for the modified user account data.

Additional features of the disclosed systems are described below.

BRIEF DESCRIPTION OF THE DRAWINGS

This disclosure will describe one or more example implementations of the systems and methods with additional specificity and detail by referencing the accompanying FIGURES. The following paragraphs briefly describe those FIGURES, in which.

DETAILED DESCRIPTION

Figure 1:
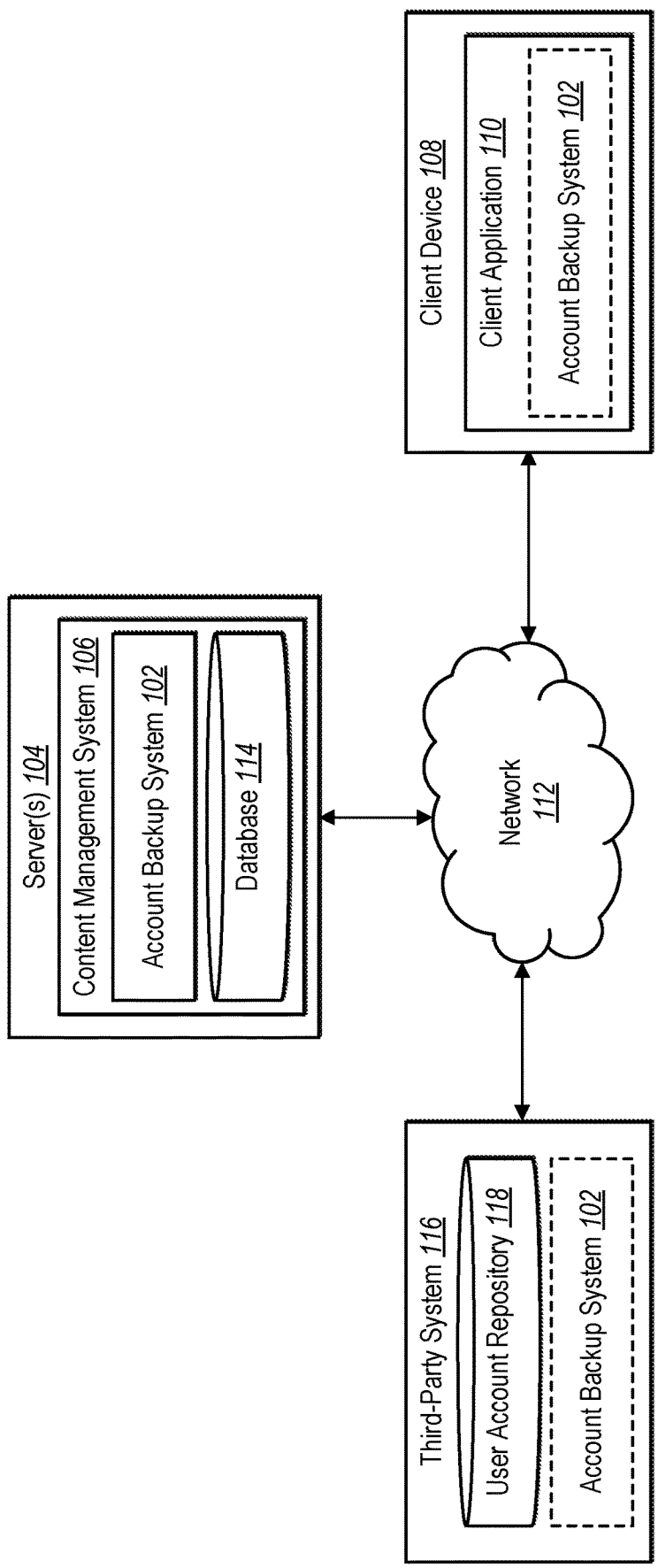
FIG. 1 illustrates a schematic diagram of an example environment of an account backup system in accordance with one or more embodiments.

This disclosure describes one or more embodiments of an account backup system that can generate and update backup instances for user account data across multiple online platforms. To facilitate backing up data for user accounts in a single, centralized location, the account backup system can be part of (or work together with) a content management system that uses cloud-based data storage to manage and maintain content items and other data. In particular, the account backup system can identify or access a user account within the content management system as a hub account or a *nexus* account for connecting to other user accounts at other online platforms or third-party systems. To back up user account data from a third-party system to a hub/*nexus* account at the content management system, the account backup system can establish a data transfer from data storage of the third-party system to data storage of the content management system. The account backup system can further download and store all or part of the user account data from the third-party system as a connected account for the hub account. In some cases, the account backup system establishes a data transfer using one or more application programming interfaces ("APIs") specific to the third-party system.

As just mentioned, the account backup system can back up user account data across multiple third-party systems and can store them at a centralized location. Specifically, for a given user account of a content management system, the account backup system can generate a data backup for each of a number of third-party user accounts within a data storage at the content management system. For example, the account backup system receives authorization from a user account to access data at a third-party system and establishes a data transfer to download or copy the user account data to the content management system. In addition, the account backup system establishes a tie or a connection between the third-party user account (e.g., the user account at the third-party system) and the user account within the content management system where the backup instance is stored (e.g., a hub account linked to multiple third-party systems). Accordingly, the hub account can access data backups stored within the content management system for multiple third-party systems linked to the hub account. In some cases, the account backup system backs up all of the user account data from a third-party system to mirror the user account. In other cases, the account backup system backs up only a portion of the user account data to provide an account snapshot or a subset of the account data.

In one or more embodiments, the account backup system updates a stored data instance for data backed up from a third-party system. In particular, the account backup system determines whether to generate an updated backup instance based on a particular trigger, such as a regular update interval (e.g., hourly, daily, or weekly), an indication of user interaction selecting an update option, and/or a detection of a modification to data at a third-party system. For instance, the account backup system can receive an indication that user account data at a third-party system has been changed or modified. In response, the account backup system can update a stored backup instance for the third-party system at the data storage of the content management system. In certain cases, the account backup system generates and stores only deltas or data changes that indicate differences between data states (rather than storing the entire contents of the data for each update). The account backup system can also customize data storage and update intervals for each data backup differently (e.g., tailored for each third-party system).

In certain embodiments, the account backup system automatically (e.g., without user input specifically prompting) distributes content items from a data backup to third-party systems. To elaborate, the account backup system can identify one or more content items within a backup instance from a first third-party system to distribute to another third-party system. For example, the account backup system can identify digital images backed up to the content management system from a first social media account and can automatically provide the digital images to another social media account linked to the hub account. In some cases, the account backup system utilizes a particular API to write content to a third-party system (as opposed to a read API).

In one or more embodiments, the account backup system can facilitate modifying data at a third-party system corresponding to data backed up within the content management system. For example, in addition to storing a backup data instance for an account at a third-party system, the account backup system can also receive user interactions to modify one or more content items (or other data) within the backup instance. In some cases, the account backup system can also propagate the modifications to a third-party system where the data was originally accessed to back up. For instance, the account backup system receives (at the content management system) an interaction to change the name of a digital image backed up from a photo library system, and the account backup system provides an indication to the photo library system to update the name of the digital image as reflected by the change within the content management system.

In some embodiments, the account backup system can restore a user account from a data backup. More specifically, the account backup system can access a data backup representing a user account at a third-party system and can restore the data backup to the third-party system to reset or restore the third-party account. In the case of an account takeover, for instance, the account backup system can communicate (e.g., via an API) with the third-party system rewrite the data for the hostage account using a data backup from the content management system, circumventing the efforts of the malicious actor or the ransomware without losing data.

In one or more embodiments, the account backup system provides various user interfaces for managing data backups from third-party systems. For example, the account backup system provides an account backup interface that summarizes account backups stored within the content management system for a particular hub account. Within the account backup interface, the account backup system can provide selectable elements for managing the individual data backups (e.g., specific to each third-party system), including settings for backup fidelity/quality, backup frequency, backup data, and/or other parameters.

As suggested above, the account backup system can provide several improvements or advantages over existing digital content systems. For example, the account backup system can provide improved flexibility over existing systems. While many existing systems are platform-specific and cannot perform data backups across different data environments (e.g., where a social media system performs its own backups apart from a photo library system which does the same), the account backup system can flexibly adapt for cross-platform data backups at a centralized storage location. Specifically, for a given user, the account backup system can utilize the storage capabilities and capacity of a cloud-based content management system to back up data associated with the user's accounts across any number of third-party systems.

Due at least in part to improving flexibility over prior digital content systems, the account backup system can also improve efficiency. To elaborate, rather than wasting resources by running data backups at each third-party system independently, the account backup system can utilize a single, centralized backup system for more efficient processing and storage. Indeed, for a given user of the content management system, the account backup system can establish data transfers with third-party system where the user has accounts and can perform data backups with each of the third-party systems without requiring the respective backup tools and storage of each of the third-party systems.

Along these lines, the account backup system can also provide more efficient user interfaces than prior digital content systems. Whereas existing systems often require separate applications and interfaces to back up data at each third-party system independently, the account backup system can provide user interfaces (e.g., an account backup interface) that centralizes the different backups for a user. From these user interfaces, the account backup system can facilitate data management for the data at each third-party system without requiring independent navigation to, or access of, separate computing applications and corresponding interfaces for each third-party system. Thus, the account backup system consumes fewer computing resources by processing fewer interactions resulting from reducing layers of applications and interfaces for managing data backups.

In addition, the account backup system can also improve data security over prior digital content systems. As opposed to existing systems that compromise user account data due to their vulnerability to account takeovers, the account backup system 102 can prevent or reduce data loss across numerous online platforms. Indeed, even if an account takeover happens, the account backup system can nevertheless retain account data backed up in the content management system. In some cases, the account backup system can further restore account data and reset a user account on a third-party system using a backup instance.

As illustrated by the foregoing discussion, the present disclosure utilizes a variety of terms to describe features and benefits of the account backup system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents. digital images, digital videos, or digital audio files). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

As used herein, the term "application session" (or sometimes simply "session") refers to an instance of use within a client application. For example, an application session refers to a set of activities performed within a single login of a client application or an application of a content management system. As another example, an application session refers to a set of activities performed within a single visit of an application or a single access of a content item. In some cases, a session requires a login (and thus different logins can separate different sessions) while in other cases, a session does not require a login and instead indicates an instance of use between closures or terminations (of an application or webpage) or between visits that are at least a threshold period of time apart (or separated by a device power off or sleep mode).

Additional detail regarding the account backup system will now be provided with reference to the FIGURES. For example, FIG. 1 illustrates a schematic diagram of an example system environment for implementing an account backup system 102 in accordance with one or more implementations. An overview of the account backup system 102 is described in relation to FIG. 1. Thereafter, a more detailed description of the components and processes of the account backup system 102 is provided in relation to the subsequent FIGURES.

As shown, the environment includes server(s) 104, a client device 108, a third-party system 116, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and/or the third-party system 116 via the network 112. For example, the client device 108 can receive user input from respective users interacting with the client device 108 (e.g., via the client application 110) to, for instance, access, generate, modify, or share a content item, to collaborate with a co-user of a different client device, or to select user interface elements for interacting with the content management system 106 or the third-party system 116. In addition, the account backup system 102 on the server(s) 104 can receive information relating to various interactions with content items and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as an account backup interface that includes options for defining backup instances of data from the third-party system 116 (or multiple third-party systems).

As illustrated in FIG. 1, the example environment also includes the server(s) 104. The server(s) 104 may generate, track, store, process, receive, and transmit electronic data, such as digital content items, backup data, interactions with digital content items, and/or interactions between user accounts or client devices. For example, the server(s) 104 may receive (e.g., via an API) data from the third-party system 106 in the form of user account data to back up and store within the database 114. In some cases, the server(s) 104 may receive data from the client device 108 in the form of a request to perform a data backup or to change backup settings for the third-party system 116. In addition, the server(s) 104 can transmit data to the client device 108 in the form of a content item or backup data associated with the third-party system 116. Indeed, the server(s) 104 can communicate with the client device 108 and/or the third-party system 116 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As suggested, the environment can include the third-party system 116. The third-party system 116 can represent a cloud-based computing system that stores data and hosts services for interacting with the client device 108 (and/or other client devices associated with respective user accounts). For example, the third-party system 116 can represent a social media system, a photo library system, an email system, an online banking system, an internet gaming system, a video sharing system, or some other internet-based system that hosts data for user accounts. As shown, the third-party system 116 includes a user account repository 118 that stores data for various user accounts (e.g., associated with the client device 108 and other client devices), including content items, profile information, and user account settings. The third-party system 116 can communicate with the server(s) 104 (e.g., via one or more APIs) to send and receive data for user accounts to back up and restore content items and other user account data.

As shown in FIG. 1, the server(s) 104 can also include the account backup system 102 as part of a content management system 106. The content management system 106 can communicate with the client device 108 to perform various functions associated with the client application 110 such as managing user accounts, managing backup data, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the account backup system 102 and/or the content management system 106 utilize the database 114 to store and access information such as backup data instances, digital content items, and other information.

Although FIG. 1 depicts the account backup system 102 located on the server(s) 104, in some implementations, the account backup system 102 may be implemented by (e.g., located entirely or in part on) one or more other components of the environment. For example, the account backup system 102 may be implemented by the client device 108, and/or the third-party system 116. For example, the client device 108 and/or the third-party system 116 can download all or part of the account backup system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the account backup system 102, bypassing the network 112. As another example, the environment may include multiple client devices, each associated with a different user account for managing digital content items. The environment may also include multiple third-party systems, each corresponding to a different set of user accounts and storing data for the user accounts, including social media posts, digital images, digital videos, or other content items. In addition, the environment can include the database 114 located external to the server(s) 104 (e.g., in communication via the network 112) or located on the server(s) 104 and/or on the client device 108.

Figure 2:
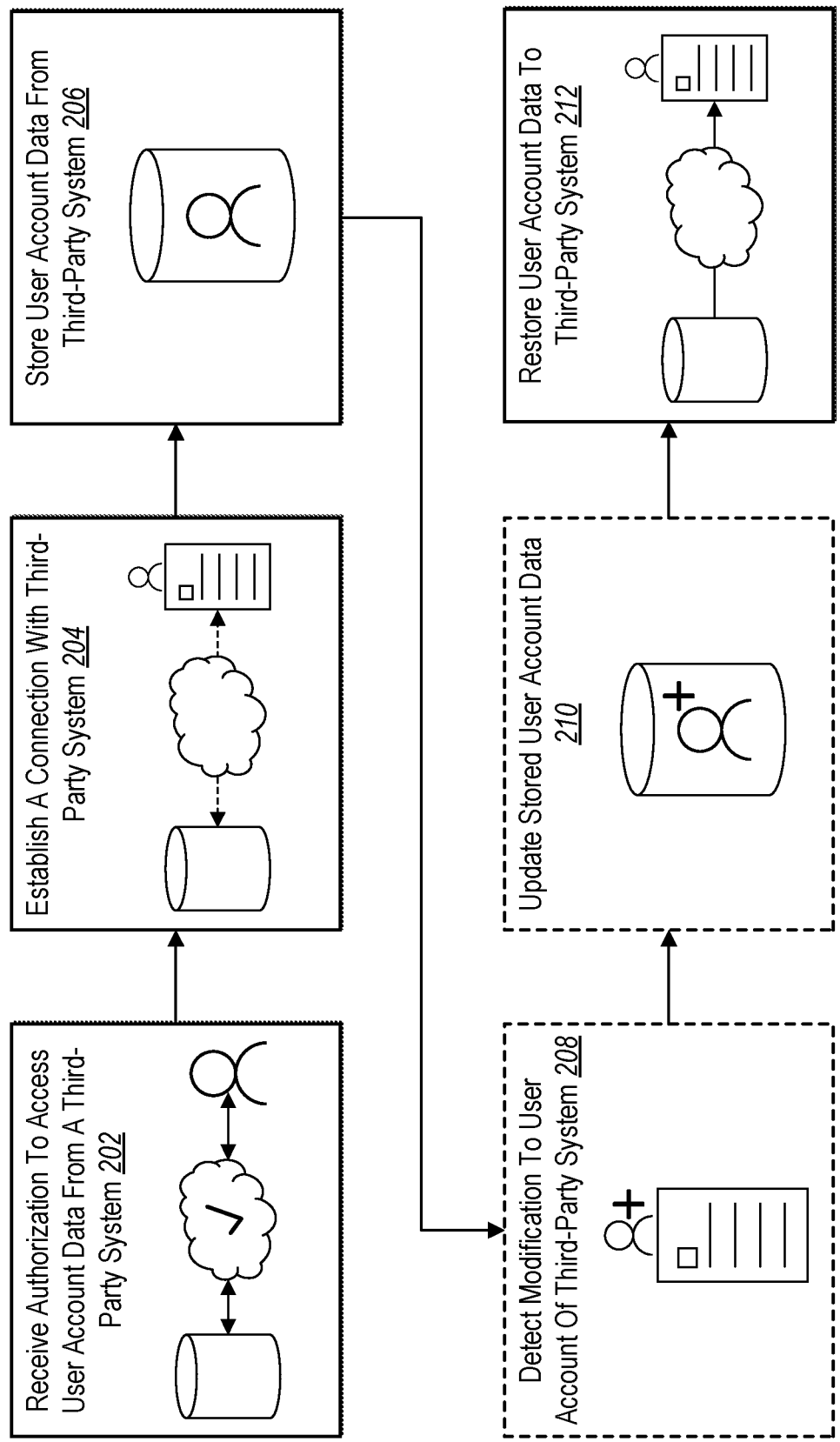
FIG. 2 illustrates an example overview of generating, updating, and restoring a data backup in accordance with one or more embodiments.

As mentioned above, the account backup system 102 can generate and restore backup data instances for user accounts across various online systems. In particular, the account backup system 102 can integrate (or establish communications) with third-party systems to store and restore backup data instances for data hosted at the third-party systems. FIG. 2 illustrates an example overview for storing and restoring backup data across online platforms in accordance with one or more embodiments. Additional detail regarding the various acts illustrated in FIG. 2 is provided thereafter with reference to subsequent FIGURES.

As illustrated in FIG. 2, the account backup system 102 performs an act 202 to receive authorization to access user account data from a third-party system (e.g., the third-party system 116). To elaborate, the account backup system 102 receives an indication of user interaction to authorize or permit the account backup system 102 to access and retrieve data from a third-party system. For example, the account backup system 102 receives authorization from the client device 108 for the account backup system 102 to access data associated with a hub account within the content management system 106. In some cases, the account backup system 102 receives authentication credentials to link or tie a user account at the third-party system 116 with a hub account within the content management system 106. Thus, the account backup system 102 can access data for the user account at the third-party system 116 from the content management system 106. The account backup system 102 can further receive authorization for accessing data from additional third-party systems as well.

As further illustrated in FIG. 2, the account backup system 102 performs an act 204 to establish a connection with the third-party system 116. More specifically, based on the authorization to access the data for the user account at the third-party system 116, the account backup system 102 establishes a connection for transferring data between the third-party system 116 and the content management system 106. For instance, based on linking the user account at the third-party system 116 with the hub account at the content management system 106, the account backup system 102 utilizes one more APIs to establish communication channels for transferring data from data storage of the third-party system 116 to data storage of the content management system 106 (e.g., the database 114), or vice-versa. In some cases, the connection between the third-party system 116 and the content management system 106 is permanent or persistent across application sessions (or for a particular time period or a threshold number of data transfers), while in other cases the account backup system 102 requires authorization for each data transfer.

Additionally, the account backup system 102 performs an act 206 to store user account data received or transferred from the third-party system 116. To elaborate, the account backup system 102 creates or generates a backup instance for the data from the user account at the third-party system 116. Indeed, the account backup system 102 can generate individual data backups for each third-party system tied to a hub account within the content management system 106. The account backup system 102 further utilizes a read API to transfer data from data storage of the third-party system 116 and to store the data within data storage of the content management system 106.

As illustrated in FIG. 2, in some embodiments, the account backup system 102 performs an act 208 to detect a modification to a user account of the third-party system 116. More specifically, the account backup system 102 detects (or receives an indication of) a change or a modification to data of a user account at the third-party system 116. For instance, the account backup system 102 detects a new digital image uploaded to a photo library or a new post to a social media feed. In some cases, the account backup system 102 compares data stored for the user account at the third-party system 116 with backup data stored for a corresponding hub account at the content management system 106 to determine that a change has occurred.

In certain embodiments, based on detecting that the data at the third-party system 116 differs from that at the content management system 106 (or otherwise detecting the change to the data at the third-party system 116), the account backup system 102 further performs an act 210 to update the stored user account data. In particular, the account backup system 102 generates an updated instance of backup data within the content management system 106 for the user account at the third-party system 116. In some embodiments, the account backup system 102 performs data backup updates at certain intervals and/or based on detecting data modifications (e.g., modifications to at least a threshold amount of data).

As further illustrated in FIG. 2, the account backup system 102 performs an act 212 to restore user account data to a third-party system 116. More specifically, the account backup system 102 restores data from a backup instance stored at the content management system 106 using a write API to replace data stored on data storage of the third-party system 116. In one or more embodiments, the account backup system 102 restores the data to the third-party system 116 in response to a user interaction requesting to restore the data. In these or other embodiments, the account backup system 102 restores the data to the third-party system 116 in response to detecting an account takeover. Indeed, in some cases, the account backup system 102 stores a data backup that mirrors the entire contents of a user account on the third-party system 116, including content items, profile information, settings, and other information. Thus, the account backup system 102 can restore the entire user account at the third-party system 116 if an account takeover takes place (or for some other reason).

Figure 3:
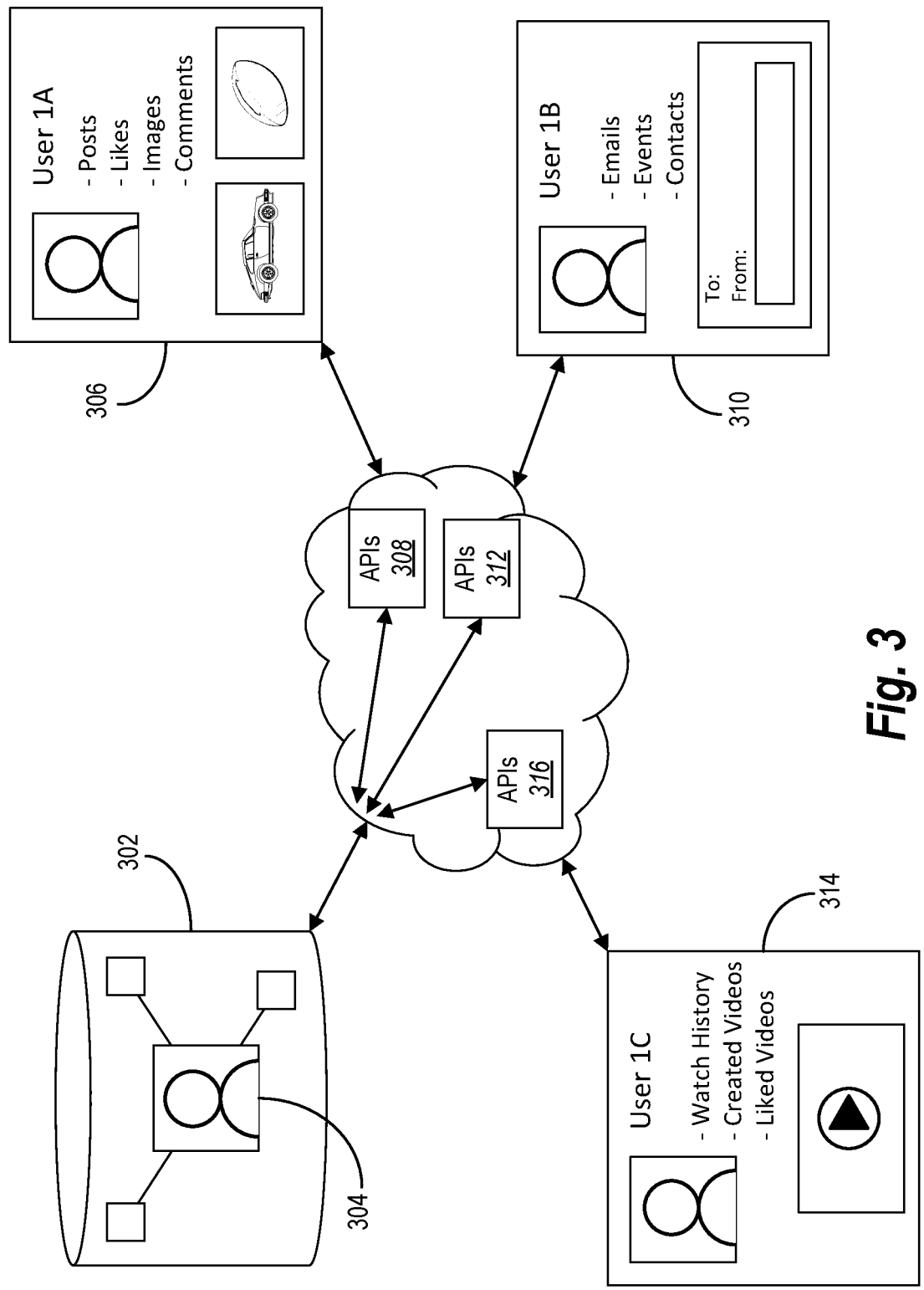
FIG. 3 illustrates an example diagram for storing and restoring data backups from third-party systems in accordance with one or more embodiments.

As mentioned, in certain described embodiments, the account backup system 102 backs up data for multiple third-party systems. In particular, the account backup system 102 receives authorization to access data for a number of different user accounts at third-party systems, where the authorization associates or links the user accounts with a hub account for storing data within the content management system 106. FIG. 3 illustrates an example diagram of generating and storing backup data for user accounts at different third-party systems in accordance with one or more embodiments.

As illustrated in FIG. 3, the account backup system 102 identifies a hub account 304 that is stored (and/or is associated with data stored) within a database 302 as part of the content management system 106. Indeed, the hub account can refer to a user account with the content management system 106 that backs up data for one or more user accounts at third-party systems. For example, the account backup system 102 receives authorization to access data from a third-party system 306, a third-party system 310, and/or a third-party system 314. In some cases, the account backup system 102 receives the authorization from the hub account 304 and/or from the respective user accounts within the various third-party systems.

As shown, the third-party system 306 is associated with user account User 1A, the third-party system 310 is associated with user account User 1B, and the third-party system 314 is associated with a user account User 1C. Indeed, each of the third-party systems have their own user accounts that are owned or managed by the same user as the hub account 304. As also shown, the third-party system 306 is a social media system that stores data for the User 1A account, including posts, likes, uploaded images, comments, and other information (e.g., profile information and metadata such as timestamps and geolocations associated with various content items posted to the third-party system 306). In addition, the third-party system 310 is an email system that stores data for the User 1B account, including emails, calendar events, and contacts. Further, the third-party system 314 is a video sharing system that stores data for the User 1C account, including a watch history, created videos, and liked videos. The account backup system 102 can further identify and access data from other types of third-party systems as well, as described above.

As further illustrated in FIG. 3, the account backup system 102 establishes data transfers with each of the third-party systems using one or more APIs. For example, the account backup system 102 utilizes one or more APIs to establish data transfers from the third-party systems to the database 302 of the content management system 106. In some cases, the account backup system 102 further utilizes APIs for writing data to the third-party systems as well. For instance, the account backup system 102 utilizes system-specific APIs, such as the APIs 308 for communicating with the third-party system 306, the APIs 312 for communicating with the third-party system 310, and the APIs 316 for communicating with the third-party system 314. Thus, the account backup system 102 can establish reading and/or writing functionality associated with the third-party systems. In some cases, the APIs 308 of the third-party system 306 allow both reading and writing data to and from its data storing, while the APIs 312 of the third-party system 310 allow only reading and not writing.

As shown, the account backup system 102 stores data from each of the third-party systems for the hub account 304 within the database 302. For example, the account backup system 102 generates separate data backups for each of the third-party systems to store and manage each of the backups independently. The account backup system 102 can generate separate directories for each of the data backups, including different root namespaces within a network (or within a database) and/or separate folders within a database. Thus, in some embodiments, the account backup system 102 can store the data from the third-party system 306 in one data backup and can further store the data from the third-party system 310 and the third-party system 314 in their own respective data backups. The account backup system 102 can also enable the hub account 304 to access and manage the data associated with the separate backups from within the content management system 106.

In one or more embodiments, the account backup system 102 not only backs up the third-party data but further organizes the backup data. To elaborate, the account backup system 102 can analyze content items backed up to the database 302 to determine content types, topics, and access patterns. For instance, the account backup system 102 can utilize one or more machine learning models to determine objects depicted in digital images and/or topics or themes associated with various digital documents. The account backup system 102 can also determine topics based on titles, headers, and other text within content items and/or content metadata. Based on the objects and topics, the account backup system 102 can generate content collections organized into topic-specific groups specific to each of the respective data backups.

Figure 4:
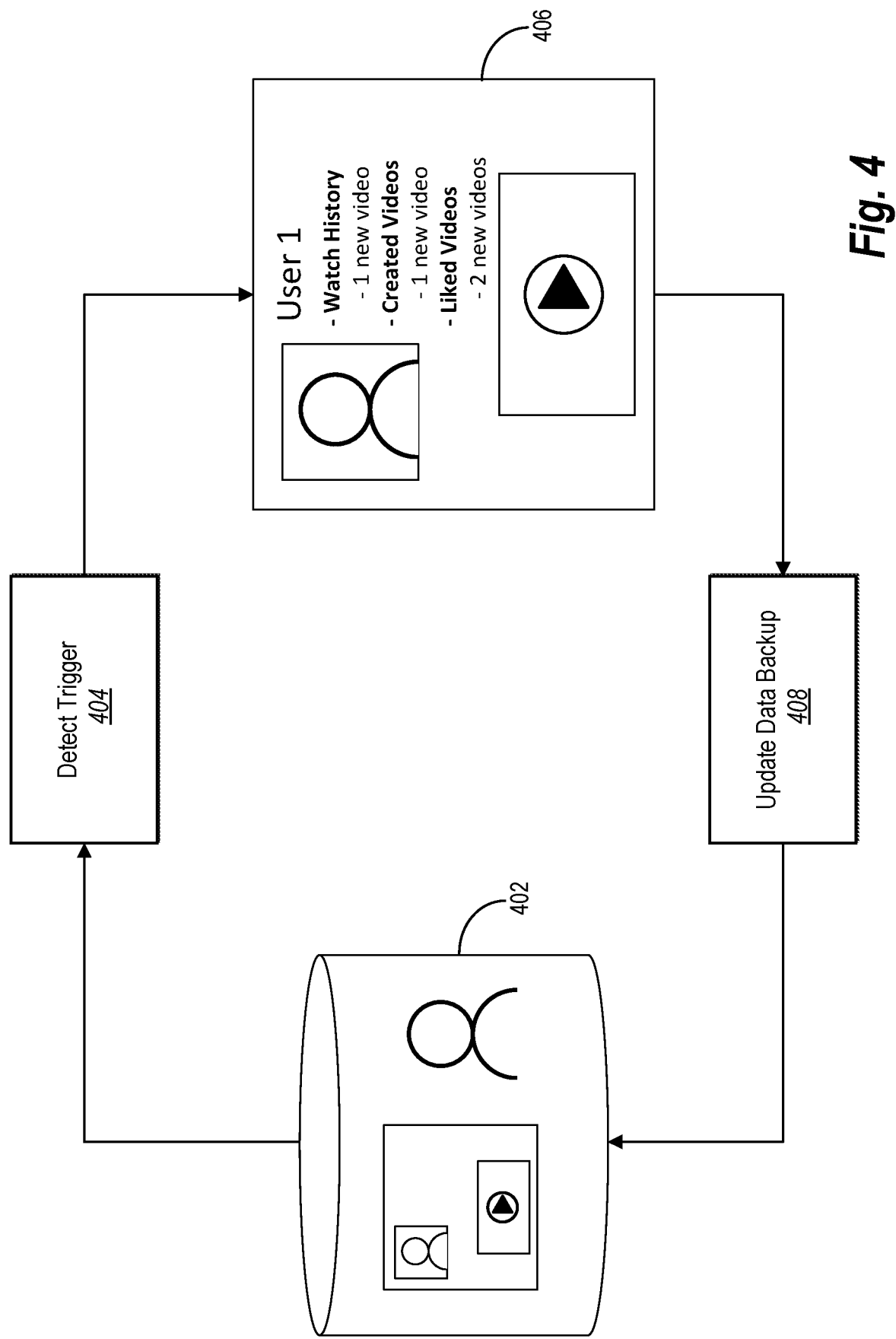
FIG. 4 illustrates an example diagram for updating a data backup in accordance with one or more embodiments.

As mentioned above, in certain described embodiments, the account backup system 102 updates a data backup stored within the content management system 106. In particular, based on one or more triggers, the account backup system 102 can generate an updated instance of a data backup to reflect new or modified data at a third-party system. FIG. 4 illustrates an example diagram for updating a backup instance in accordance with one or more embodiments.

As illustrated in FIG. 4, the account backup system 102 identifies a database 402 part of (e.g., managed or maintained by) the content management system 106. Within the database 402, the account backup system 102 accesses a hub account and stores backup data for the hub account, where the each data backup corresponds to a different third-party system. As shown, the account backup system 102 stores a data backup to store data from a third-party system 406 (e.g., a video sharing system) for which the account backup system 102 receives authorization to access stored data for a user account (e.g., User 1).

In addition, the account backup system 102 performs an act 404 to detect a trigger. To elaborate, the account backup system 102 detects an update trigger that prompts or instigates an update of a data backup within the database 402. In some embodiments, the account backup system 102 receives a user interaction requesting an update (e.g., via the client device 108). In the same or other embodiments, the account backup system 102 determines that a threshold time has elapsed since a previous update (e.g., based on a regular update interval).

In one or more embodiments, the account backup system 102 detects a trigger in the form of a modification to data at the third-party system 406. For instance, the account backup system 102 detects that at least a threshold amount of data has been modified (e.g., a threshold data size has changed or been affected by user interaction) or that at least a threshold number of user interactions have occurred in relation to the data of the user account within the third-party system 406. In some cases, the account backup system 102 determines that a threshold data change has occurred by comparing a data backup within data at the content management system 106 to corresponding data at the third-party system 406. As shown, the account backup system 102 detects that, compared to the data backup in the database 402, the watch history at the third-party system 406 includes one new video, the created videos include one new video, and the liked videos includes two new videos. In some cases, detecting one or more of these new data triggers the account backup system 102 to update the data backup at the database 402.

Accordingly, based on detecting the trigger, the account backup system 102 further performs an act 408 to update a data backup. In particular, the account backup system 102 generates an updated backup instance to reflect the changes or modifications made to the user account data at the third-party system 406. In some embodiments, the account backup system 102 generates the updated backup instance by determining or generating deltas or differences between a prior backup instance and the newly modified data at the third-party system 406. For example, the account backup system 102 generates an update delta that indicates a change from a previous backup instance (e.g., a previous state of the backed up data) and new or updated backup instance. Thus, in certain cases, the account backup system 102 stores update deltas for data backups rather than downloading all of the user account data at the third-party system 406 anew with each update or iteration.

In some cases, the account backup system 102 backs up third-party data based on a schedule. To elaborate, the account backup system 102 can detect recurring triggers that form a backup schedule at regular intervals. In certain embodiments, the account backup system 102 generates an initial backup instance and updates the backup instance based on a backup schedule. The account backup system 102 can further store each updated instance in a version history. In one or more embodiments, the account backup system 102 receives a schedule from a client device or determines a predicted schedule based on historical backups (e.g., by predicting when a user account typically performs backups).

Figure 5:
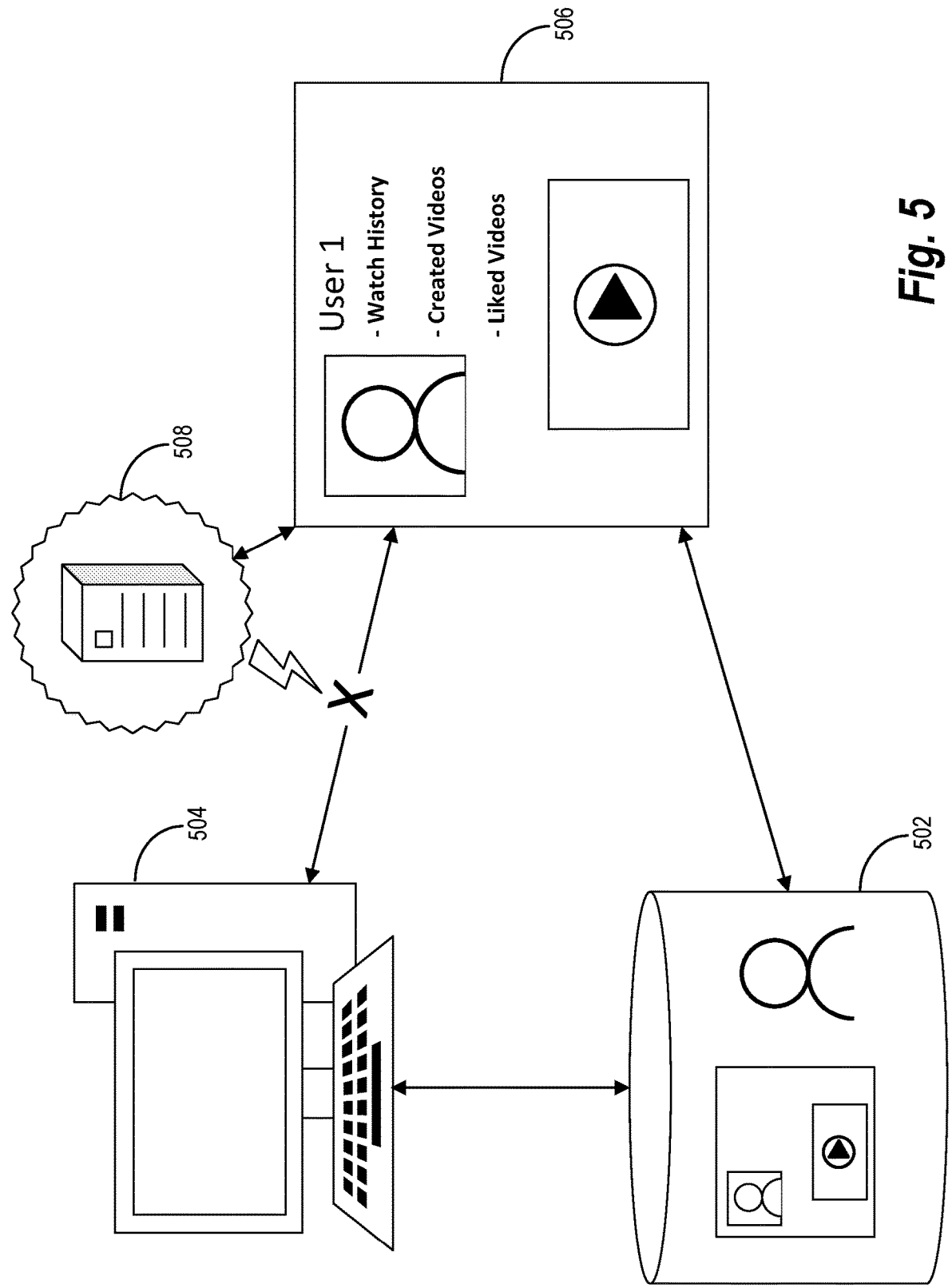
FIG. 5 illustrates an example diagram for circumventing account takeovers in accordance with one or more embodiments.

As mentioned above, in certain described embodiments, the account backup system 102 alleviates or reduces the dangers or damage caused by account takeovers. In particular, the account backup system 102 can avoid or reduce data loss caused by account takeovers from malicious actors or ransomware by storing and utilizing data backups for (the entire contents of) hostage accounts. FIG. 5 illustrates an example diagram for circumventing the issues encountered by account takeovers in accordance with one or more embodiments.

As illustrated in FIG. 5, the account backup system 102 identifies a client device 504 (e.g., the client device 108) used to access and use a user account within a third-party system 506. As shown, the client device 504 accesses a user account (User 1) within a video sharing system. As also shown, the client device 504 accesses a database 502 within the content management system 106 where the account backup system 102 manages data backups for a user account within the content management system 106. For instance, the account backup system 102 manages a data backup for user account data within the third-party system 506, including a watch history, created videos, liked videos, profile information, and/or other information associated with the third-party user account.

As further shown, a malicious system 508 infiltrates the User 1 account within the third-party system 506 and performs or executes an account takeover. For instance, the malicious system 508 prevents or blocks the client device 504 from accessing the User 1 account and holds the user account data (e.g., the digital videos, the watch history, and/or other data associated with the user account on the third-party system 506) hostage. In some cases, the malicious system 508 requires payment to permit access to the user account again. In the same or other cases, the malicious system 508 or deletes, moves, or otherwise corrupts (e.g., by installing a computer virus) the data at the third-party system 506.

To prevent or reduce the damage done by the malicious system 508, the account backup system 102 maintains a data backup of the user account at the third-party system 506. In some cases, the account backup system 102 updates the data backup based on triggers such as time intervals or data changes, as described above. Thus, the account backup system 102 keeps an accurate and current version of the data from the third-party system 506 within the database 502. Accordingly, if the client device 504 is locked out of the account on the third-party system 506, the account backup system 102 nevertheless enables the client device 504 to access the data backup from the database 502, thereby preventing data loss.

In some cases, the account backup system 102 maintains a version history of the data backup. Thus, if the account backup system 102 backs up data that is corrupted or updates a backup instance that has data removed by the malicious system 508, the account backup system 102 can nevertheless revert to a previous version of the data backup to recover the lost data or return corrupted data to an uncorrupted state. In certain embodiments, depending on permissions and APIs, the account backup system 102 can further restore the account on the third-party system 506 by reverting the account to a previous version or a previous state before the account takeover.

Figure 6:
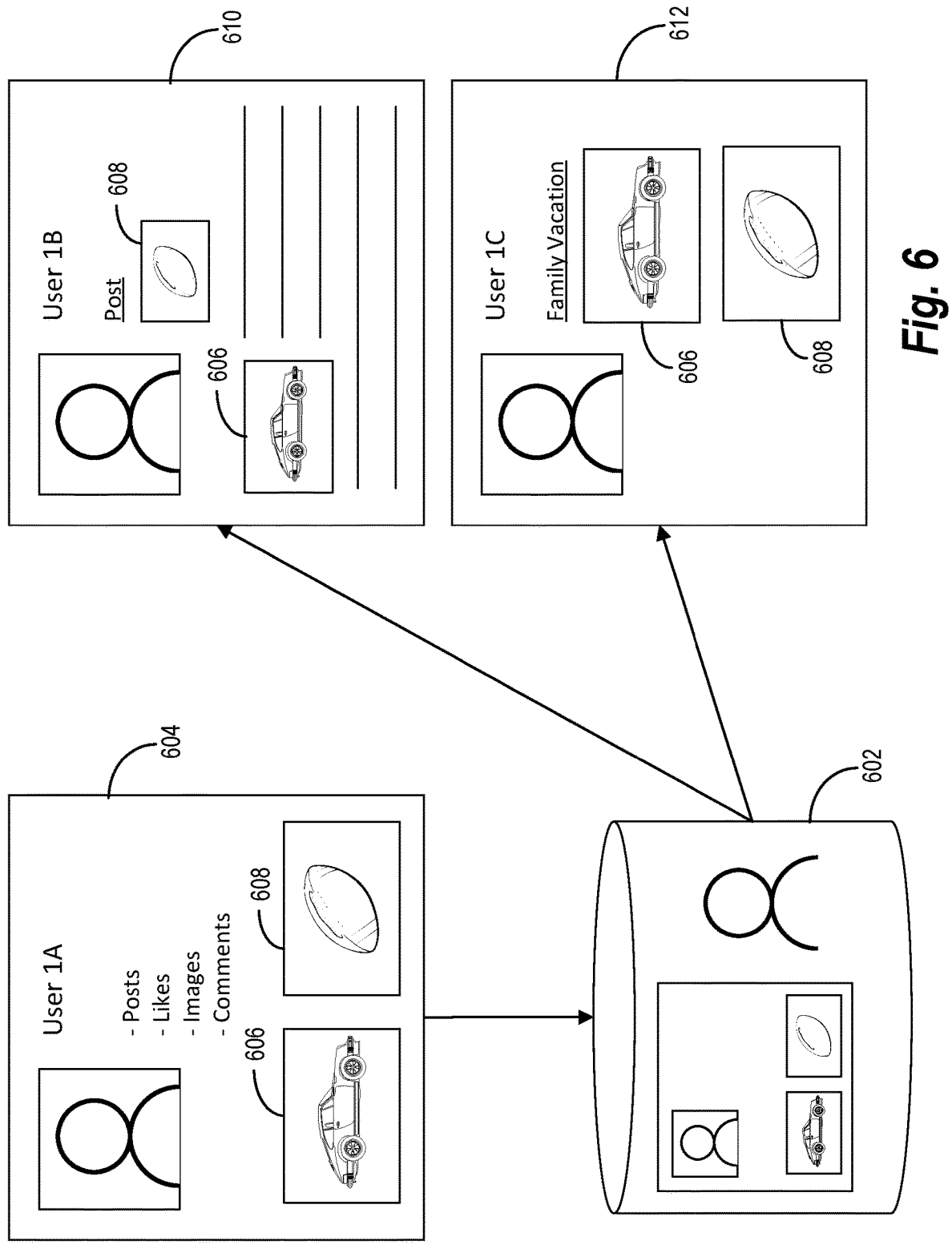
FIG. 6 illustrates an example diagram for distributing backup data to third-party systems in accordance with one or more embodiments.

As mentioned above, in certain embodiments, the account backup system 102 can use a data backup to distribute data to third-party systems. In particular, the account backup system 102 can receive a content item (e.g., a digital image) from one third-party system and can automatically distribute the content item to one or more other third-party systems. FIG. 6 illustrates an example diagram for distributing data from a backup to one or more third-party systems in accordance with one or more embodiments.

As illustrated in FIG. 6, the account backup system 102 generates and stores a data backup within a database 602 of the content management system 106. More specifically, the account backup system 102 generates a backup instance within the database 602 that includes content items stored for a user account (User 1A) within a third-party system 604. As shown, the account backup system 102 backs up content items from the third-party system 604, such as a digital image 606 and a digital image 608 (and/or other data, such as posts, likes, and comments).

In one or more embodiments, the account backup system 102 further distributes the digital image 606 and/or the digital image 608 to a third-party system 610 and to a third-party system 612. For example, the account backup system 102 determines that the third-party system 610 and the third-party system 612 are social media accounts like the third-party system 604 and that automatic distribution of digital content is appropriate. As shown, the third-party system 610 and the third-party system 612 are social media accounts with different styles layouts and that are each receptive of digital images for posting to respective social media feeds. Indeed, in some cases, the account backup system 102 determines account types for different data backups, where an account type can indicate whether the user account at the third-party system from which the backup is generated is a social media account, a video sharing account, an email account, a banking account, a photo library account, or some other type of online account.

In certain embodiments, based on determining that the third-party system 610 is the same account type as (or an account type that is compatible with receiving data from) the third-party system 604, the account backup system 102 provides the digital image 606 and the digital image 608 to the third-party system 610. In some cases, the account backup system 102 determines account permissions for the third-party system 610 and utilizes a write API to provide the digital image 606 and the digital image 608 to the User 1B account within the third-party system 610. Indeed, the account backup system 102 can automatically post the digital image 606 and/or the digital image 608 within a social media feed of the third-party system 610. In some cases, the automatic distribution of content items is further based on determining that the account backup system 102 stores and maintains data backups for the source third-party system (e.g., the third-party system 604) and the destination third-party system (e.g., the third-party system 610 or the third-party system 612).

Figure 7:
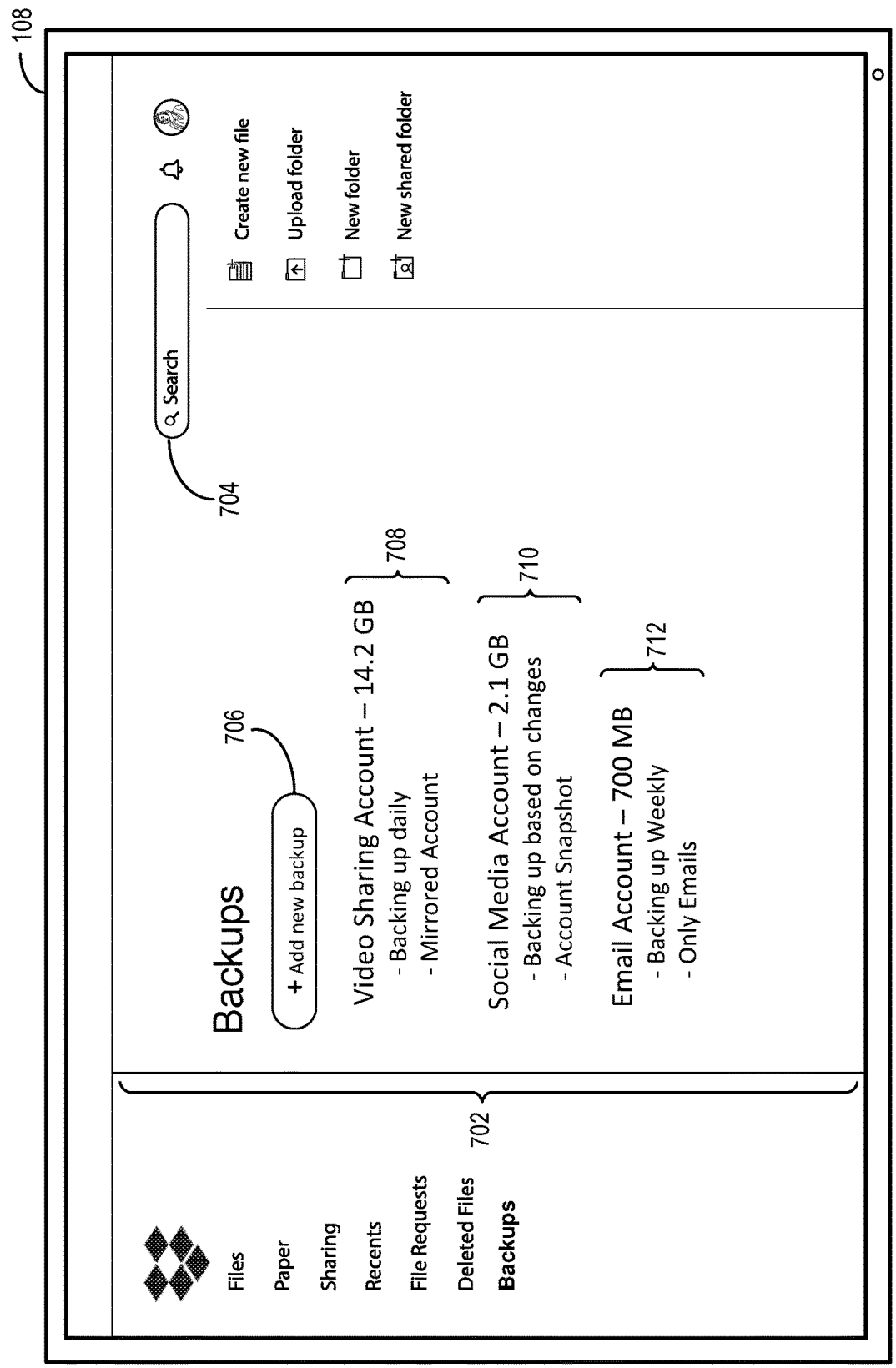
FIG. 7 illustrates an example account backup interface in accordance with one or more embodiments.

As mentioned above, in certain embodiments, the account backup system 102 generates and provides an account backup interface for display on a client device. In particular, the account backup system 102 provides an account backup interface for managing data backups from multiple third-party systems within a single, centralized interface. FIG. 7 illustrates an example account backup interface in accordance with one or more embodiments.

As illustrated in FIG. 7, client device 108 displays or presents an account backup interface 702 that includes backup summaries for three different data backups, each associated with a different third-party system. For example, the backup summary 708 includes a selectable element (e.g., the text of the account name) for accessing and managing a data backup for a video sharing account. As another example, the backup summary 710 includes a selectable element for accessing and managing a social media account. Further, the backup summary 712 includes a selectable element for accessing and managing an email account. Each of the backup summaries and the corresponding data backups are linked to, and accessible by, a particular hub account within the content management system 106, as indicated by the user profile icon in the upper-right of the account backup interface 702.

As further illustrated in FIG. 7, the backup summaries also indicate information pertaining to the respective data backups. For example, the backup summary 708 indicates a size of the data backup (14.2 GB), a backup trigger for the data backup ("Backing up daily"), and a backup storage setting for the data backup ("Mirrored Account"). Indeed, the account backup system 102 can utilize different triggers for each backup and can further back up different types and/or amounts of data for each backup. Specifically, for the video sharing account, the account backup system 102 generates and maintains a data backup that mirrors the entire contents of the video sharing account on a third-party system. The account backup system 102 further performs backups for the video sharing account on a daily basis (e.g., generated updated backup instances each day).

As another example, the backup summary 710 indicates a backup size (2.1 GB), a backup trigger ("Backing up based on changes"), and a backup storage setting for the social media account ("Account Snapshot"). Specifically, the account backup system 102 generates and maintains a social media account backup for an account snapshot of the social media account. In some cases, an account snapshot can refer to a captured state of a user account that includes less than (or up to) the data of a fully mirrored account backup but that nevertheless captures and represents that state of the account at a point in time. For instance, an account snapshot can include a set of account parameters and/or a set of content items stored for the user account that define the status of the account for a backup instance. In addition, the account backup system 102 performs updates for the backup based on changes to data on the third-party system (e.g., based on a threshold amount of data change or a threshold number of interactions or modifications).

As a further example, the backup summary 712 indicates a backup size (700 MB), a backup trigger ("Backing up Weekly"), and a backup storage setting ("Only Emails") for an email account. Indeed, the account backup system 102 manages a data backup for an email system that stores only emails and that backs up on a weekly basis. In one or more embodiments, the account backup system 102 generates the backup for the email account (and the other third-party accounts) according to settings specific to the email account. Indeed, as described in further detail below, the account backup system 102 can customize data backup settings for each backup, including what triggers initiate a backup, what data to back up, the quality or fidelity of backed up data, and other settings.

In some embodiments, the account backup system 102 deliberately makes the account backup interface 702 more difficult to locate. For example, in cases where the account backup system 102 enables only one-way synchronization of data backups (e.g., only read APIs to store and update data but no write APIs to restore or change data at a third-party system), the account backup system 102 can hide the account backup interface in a more obscure location or behind a password wall. Accordingly, in some cases, the account backup system 102 prevents (or reduces the likelihood of) unintentional alterations of data backups that would result in data loss for a user account.

As further illustrated in FIG. 7, the account backup interface 702 includes a search element 704. In particular, the account backup system 102 can receive a search query entered into the search element 704 to search for data backups and/or individual content items within data backups stored on the content management system 106 (for a particular hub account). Indeed, the account backup system 102 can index the content items backed up from various third-party systems and can make the content items searchable and accessible within the hub account of the content management system 106. Thus, in response to receiving a search query, the account backup system 102 can identify a content item from one or more data backups that corresponds to the query and can provide the content item for display, along with an indication of the data backup where the content item is located.

Additionally, the account backup interface 702 includes an add backup option 706. To elaborate, based on receiving an indication of user interaction selecting the add backup option 706, the account backup system 102 can prompt a user to provide additional information for a user account at a third-party system (including authorization to access data from the account at the third-party system). Based on receiving authorization, the account backup system 102 can further generate a new data backup for the third-party system and can add a new backup summary to the account backup interface 702.

Figure 8:
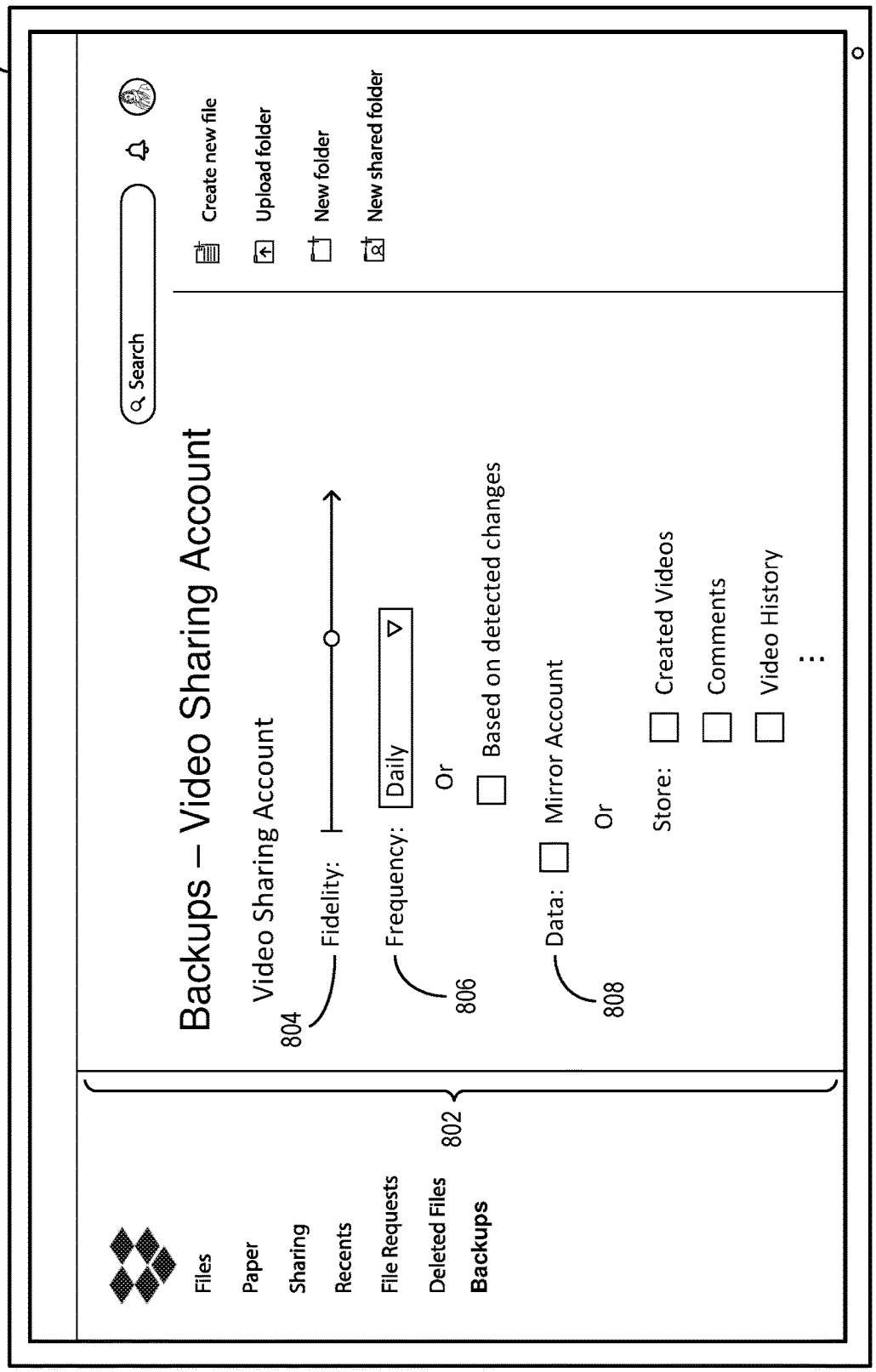
FIG. 8 illustrates an example backup management interface in accordance with one or more embodiments.

As mentioned above, in certain embodiments, the account backup system 102 generates and provides a backup management interface for a particular data backup. In particular, the account backup system 102 provides a backup management interface in response to a selection of a data backup from an account backup interface summarizing various data backups. FIG. 8 illustrates an example backup management interface in accordance with one or more embodiments.

As illustrated in FIG. 8, the client device 108 presents or displays a backup management interface 802. The backup management interface 802 includes various interactive elements for customizing or modifying a data backup for the video sharing account. For example, the backup management interface 802 includes a fidelity element 804 that is selectable to change a fidelity or a quality (e.g., a resolution of an image/vide or a framerate of a video or a sample rate of an audio file) of data backed up from a third-party system. In some cases, the account backup system 102 receives a user interaction with the fidelity element 804 (e.g., to move the slider up or down), and the account backup system 102 adjusts the fidelity of backup data accordingly.

For example, the account backup system 102 modifies the fidelity or quality of data backed up from a third-party system by using compression algorithms and/or various codecs. In certain embodiments, the account backup system 102 modifies or updates current and/or previous backup instances (already backed up) to match a modified fidelity. In these or other embodiments, the account backup system 102 retains previous backup instances in their original fidelities and generates updated backups using a modified fidelity going forward from the time of adjustment via the fidelity element 804. In some cases, full fidelity (e.g., where the slider is at the right-most location) indicates backing up data in its original quality. In these or other cases, the account backup system 102 backs up data with lower fidelity (or quality) by compressing content items such as images, videos, audio clips, and/or other content items. In one or more embodiments, a third-party system may store multiple versions of a content item, such as a thumbnail version (or a low-quality version) and a high-quality version. Thus, the account backup system 102 can download and store low-quality versions of content items in some instances.

As further illustrated in FIG. 8, the backup management interface 802 includes a trigger element 806. In particular, the account backup system 102 can receive a user interaction with the trigger element 806 to select or modify a particular backup trigger for updating the data backup for the video sharing account. For example, the account backup system 102 can receive a user interaction to select an update frequency or an update interval (e.g., hourly, daily, weekly, monthly or on some other interval). As another example, the account backup system 102 can receive a user interaction to select a different trigger, such as detecting a change of data at the third-party system that hosts the video sharing account. In some cases, the account backup system 102 can provide further options to select, as a trigger, a threshold amount of data change or an update based on any change that occurs within the data of an account at a third-party system.

As also illustrated in FIG. 8, the backup management interface 802 includes a data backup element 808. In particular, the account backup system 102 can receive a user interaction with the data backup element 808 to determine how much and/or which types of data to back up from a third-party system. For example, the account backup system 102 can provide options for mirroring an account from a third-party system or for storing particular (types of) content items associated with the user account at the third-party system. In mirroring an account, the account backup system 102 stores all relevant data for a user account at a third-party system, including content items, profile information, content metadata, account history, and other information for fully copying the account to the content management system 106 (e.g., for fully restoring the account if necessary). Alternatively, the account backup system 102 can provide an option to store an account snapshot by storing a set of content items for the user account (with or without profile information or other user data). As shown, the account backup system 102 can also provide options for selected particular content items or types of content items to back up from the user account at the third-party system.

In one or more embodiments, the account backup system 102 provides different interface elements for different data backups. More particularly, based on the (type of) user account data backed up within the content management system 106, the account backup system 102 can determine which interface elements to provide within the backup management interface 802. In some embodiments, for a banking account backup, the account backup system 102 may not provide a fidelity element. For a photo library account or a video sharing account, on the other hand, the account backup system 102 can provide a fidelity element. As another example, the account backup system 102 may customize update interval options depending on the (type of) backed up account. For banking account data, for instance, the account backup system 102 may provide only weekly or monthly update options (or may not provide any options depending on the API of the third-party system and/or other permissions/regulations). Further, the account backup system 102 can determine or detect which types of content items are stored within a data backup (or on the third-party system), and the account backup system 102 can provide corresponding elements for selecting which (types of) content items to back up.

Figure 9:
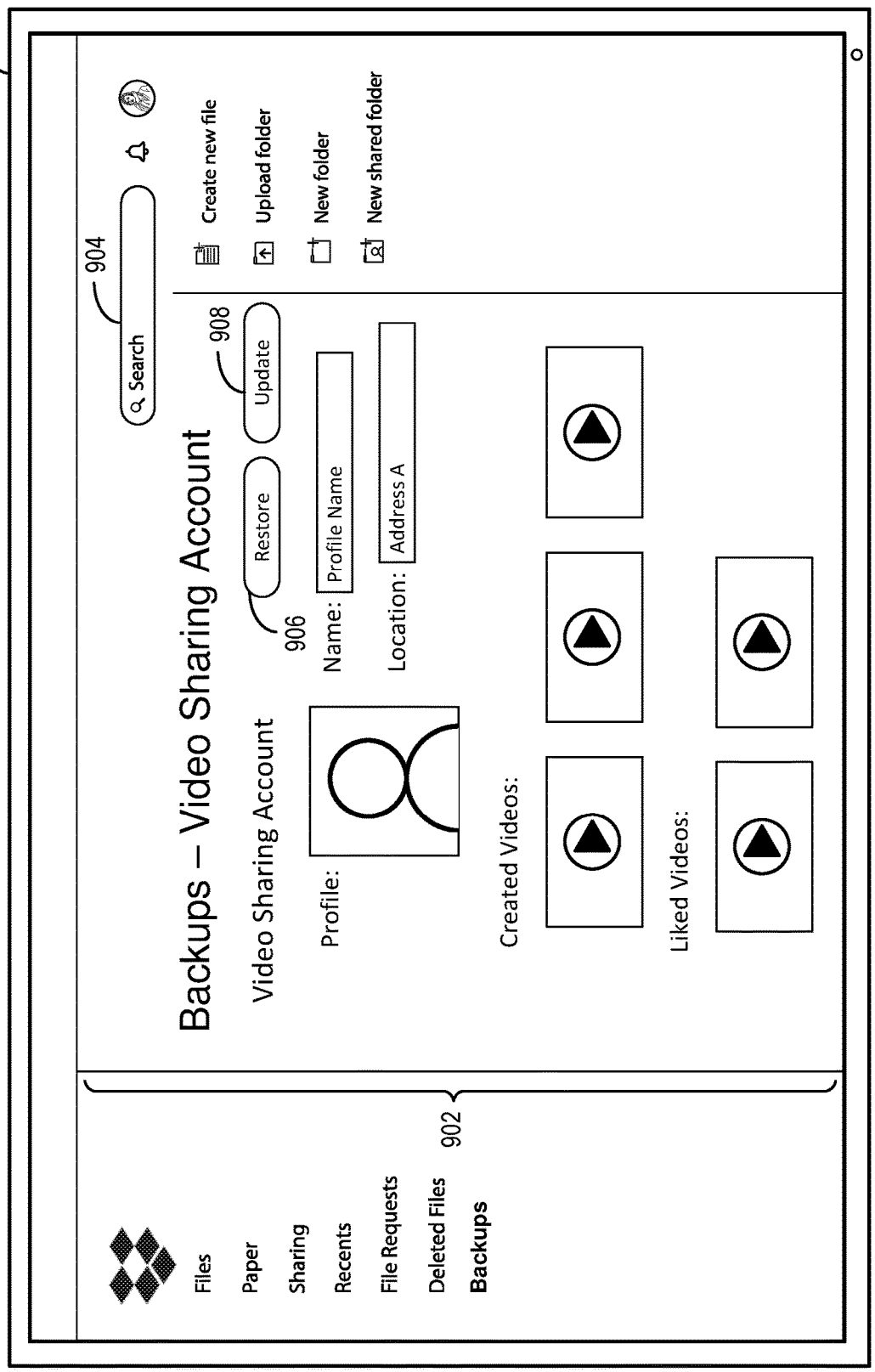
FIG. 9 illustrates an example backup content interface in accordance with one or more embodiments.

As mentioned above, in certain described embodiments, the account backup system 102 provides a backup content interface for viewing, managing, and/or editing data backed up from a third-party system. In particular, the account backup system 102 provides a backup content interface for managing or editing content stored for a particular third-party user account. FIG. 9 illustrates an example backup content interface in accordance with one or more embodiments.

As illustrated in FIG. 9, the client device 108 presents or displays a backup content interface 902. The backup content interface 902 includes data backed up for a video sharing account from a third-party system. For example, the backup content interface 902 includes created videos, liked videos, profile information, and other data backed up from the third-party system. Thus, the account backup system 102 allows a user to access, manage, and/or modify backup data stored from a third-party system directly within the content management system 106.

In one or more embodiments, the account backup system 102 enables two-way synchronization of data backups. For example, the account backup system 102 facilitates modifications to content items directly within the data backup of the content management system 106 and then propagates the modifications to the corresponding third-party system. Specifically, the account backup system 102 can receive a modification to profile information, to a created video, and/or to other backed up data via user interaction within the backup content interface 902. The account backup system 102 can further communicate with the third-party system for the video sharing account to cause the third-party system to implement the modifications made to the data backup at the content management system 106.

On the other hand, in certain embodiments, the account backup system 102 enables only one-way synchronization of data backups. For instance, the account backup system 102 preserves backup integrity and prevents modifications of a data backup by implementing one-way synchronization where no edits are performable at the content management system 106. In these cases, the account backup system 102 enables viewing data that is backed up but prevents editing or modifying the data.

As further illustrated in FIG. 9, the backup content interface 902 includes a search element 904. The account backup system 102 can receive a search query via the search element 904 to search for a content item within the data backup of the video sharing system. In response to receiving a search query, the account backup system 102 can present one or more content items for display that correspond to the search query. In some cases, the search element 904 is specific to the particular data backup of the backup content interface 902 (e.g., for the video sharing interface), and the account backup system 102 thus provides search results only from the data backup of the corresponding third-party system.

Additionally, the backup content interface 902 includes a restore element 906. The account backup system 102 can receive a user interaction selecting the restore element 906, whereupon the account backup system 102 can communication with the third-party system (via an API) to restore a user account using the backup data. In some instances, such as in cases where the backup data represents a fully mirrored account, the account backup system 102 fully restores a user account by replacing the data at the third-party system with the backup data from content management system 106. In other instances, the account backup system 102 restores one or more content items backed up within the backup data (e.g., based on user selection of which content to restore). In some cases, such as in cases where a third-party system prohibits two-way synchronization and/or does not provide a write API, the account backup system 102 can refrain from providing the restore element 906 within the backup content interface 902 because restoring a backup is not possible.

As further illustrated in FIG. 9, the backup content interface 902 includes an update element 908. For example, in response to user interaction with the update element 908, the account backup system 102 can update a data backup within the content management system 106. Indeed, user interaction with the update element 908 can act as a trigger for initiating or prompting an update to backup data. Thus, the account backup system 102 generates an updated instance of backup data in response to a selection of the update element 908.

The components of the account backup system 102 can include software, hardware, or both. For example, the components of the account backup system 102 can include one or more instructions stored on a computer-readable storage medium and executable by processors of one or more computing devices. When executed by one or more processors, the computer-executable instructions of the account backup system 102 can cause a computing device to perform the methods described herein. Alternatively, the components of the account backup system 102 can comprise hardware, such as a special purpose processing device to perform a certain function or group of functions. Additionally or alternatively, the components of the account backup system 102 can include a combination of computer-executable instructions and hardware.

Furthermore, the components of the account backup system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the account backup system 102 may be implemented as part of a stand-alone application on a personal computing device or a mobile device.

FIGS. 1-9, the corresponding text, and the examples provide a number of different systems and methods for generating, managing, and restoring data backups for user accounts at third-party systems. In addition to the foregoing, implementations can also be described in terms of flowcharts comprising acts steps in a method for accomplishing a particular result. For example, FIG. 10 illustrates an example series of acts for generating, managing, and restoring data backups for user accounts at third-party systems.

Figure 10:
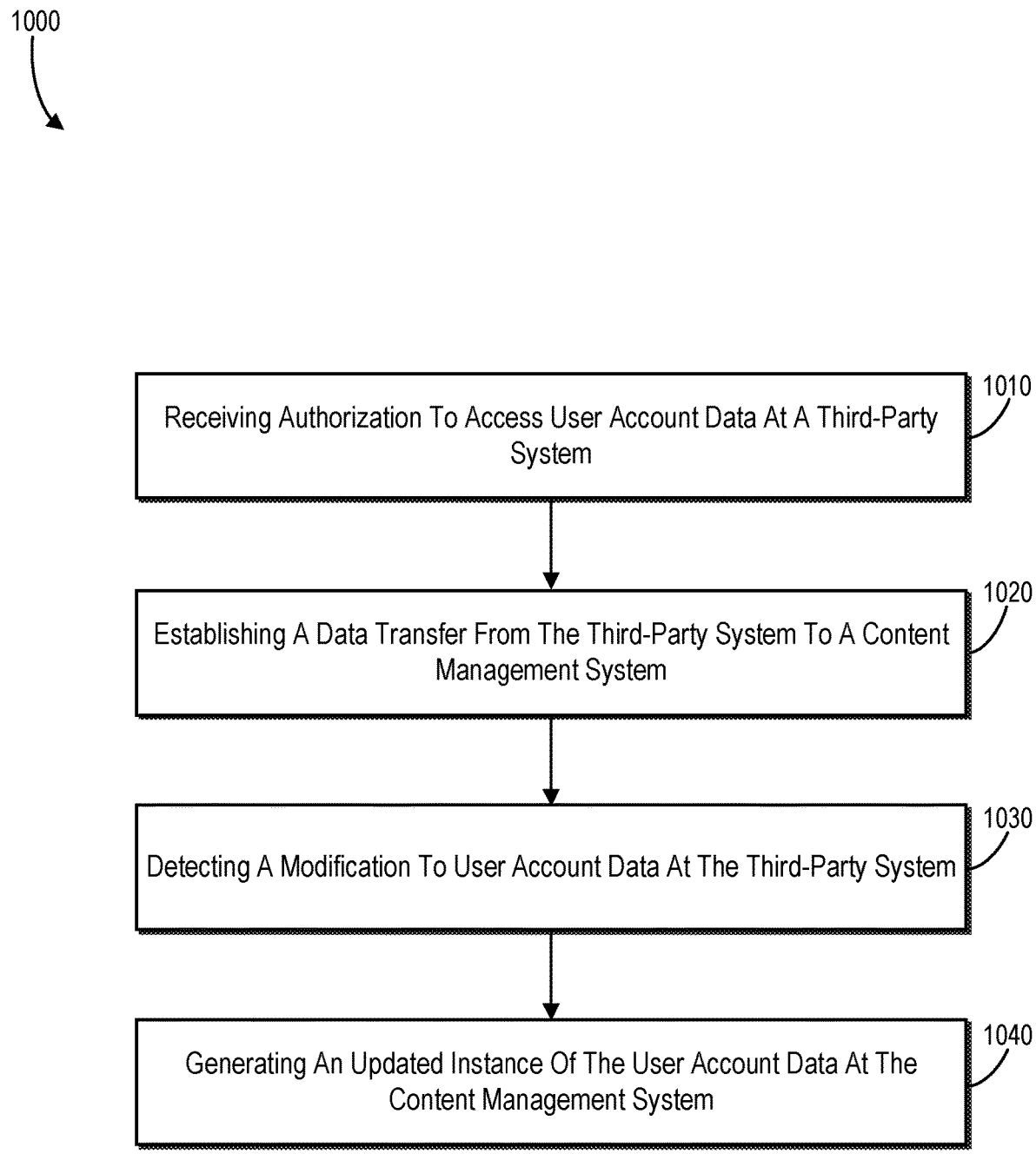
FIG. 10 illustrates a flowchart of a series of acts for generating, updating, and restoring a data backup for user account data at a third-party system in accordance with one or more embodiments.

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer-readable medium can comprise instructions, that when executed by one or more processors, cause a computing device to perform the acts of FIG. 10. In still further implementations, a system can perform the acts of FIG. 10.

As illustrated in FIG. 10, the series of acts 1000 may include an act 1010 of receiving authorization to access user account data at a third-party system. The series of acts 1000 also includes an act 1020 of establishing a data transfer from the third-party system to a content management system. Additionally, the series of acts 1000 includes an act 1030 of detecting a modification to user account data at the third-party system. Further, the series of acts 1000 includes an act 1040 of generating an updated instance of the user account data at the content management system.

In some embodiments, the series of acts 1000 includes an act of receiving, at a content management system, authorization to access data associated with a user account on (or hosted or maintained by) a third-party system. The series of acts 1000 can include an act of, based on the authorization to access the data from the third-party system, establishing a data transfer from data storage of the third-party system to store an initial data instance of the data associated with the user account on (or hosted or maintained by) the third-party system within data storage of the content management system. The series of acts 1000 can also include an act of detecting a modification to the data associated with the user account on (or hosted or maintained by) the third-party system. Further, the series of acts 1000 can include an act of, in response to detecting the modification, generating an updated data instance by updating the initial data instance within the data storage of the content management system to reflect the modification to the data associated with the user account on (or hosted or maintained by) the third-party system.

In certain embodiments, the series of acts 1000 includes an act of establishing the data transfer from the data storage of the third-party system by: utilizing an application programming interface to receive the data associated with the user account from the data storage of the third-party system; and generating the initial data instance to mirror, within the data storage of the content management system, the data associated with the user account at the third-party system.

The series of acts 1000 can include an act of detecting the modification to the data associated with the user account on the third-party system by determining that at least a threshold amount of user account data has been modified at the third-party system. In some embodiments, the series of acts 1000 includes an act of establishing an additional data transfer to the data storage of the third-party system to restore the data associated with the user account at the third-party system from the updated data instance at the content management system.

In one or more embodiments, the series of acts 1000 includes an act of providing, for display on a client device, an account backup interface comprising selectable elements for managing data instances stored within the data storage of the content management system for a plurality of user accounts associated with respective third-party systems and corresponding to an account within the content management system. In the same or other embodiments, the series of acts 1000 includes an act of receiving a content item via the data transfer from the data storage of the third-party system to the data storage of the content management system and an act of, in response to receiving the content item, automatically distributing the content item to one or more additional third-party systems associated with an account of the content management system.

The series of acts 1000 can include an act of receiving, via a client device, a user interaction modifying a content item stored within the data storage of the content management system and received via the data transfer from the third-party system. The series of acts 1000 can also include an act of, based on the user interaction, providing an indication to the third-party system to update the data associated with the user account to reflect changes resulting from the user interaction modifying the content item at the content management system.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
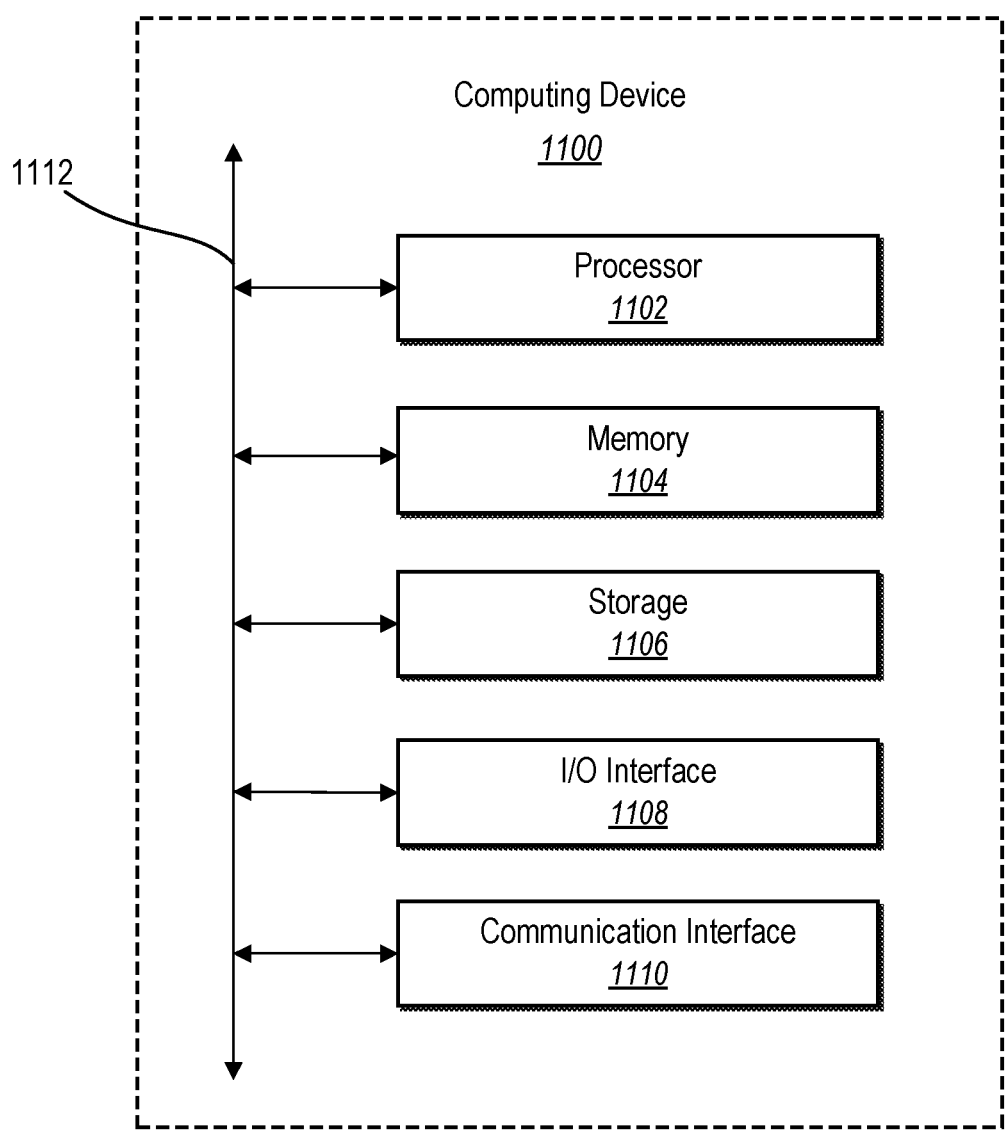
FIG. 11 illustrates a block diagram of an exemplary computing device in accordance with one or more embodiments.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
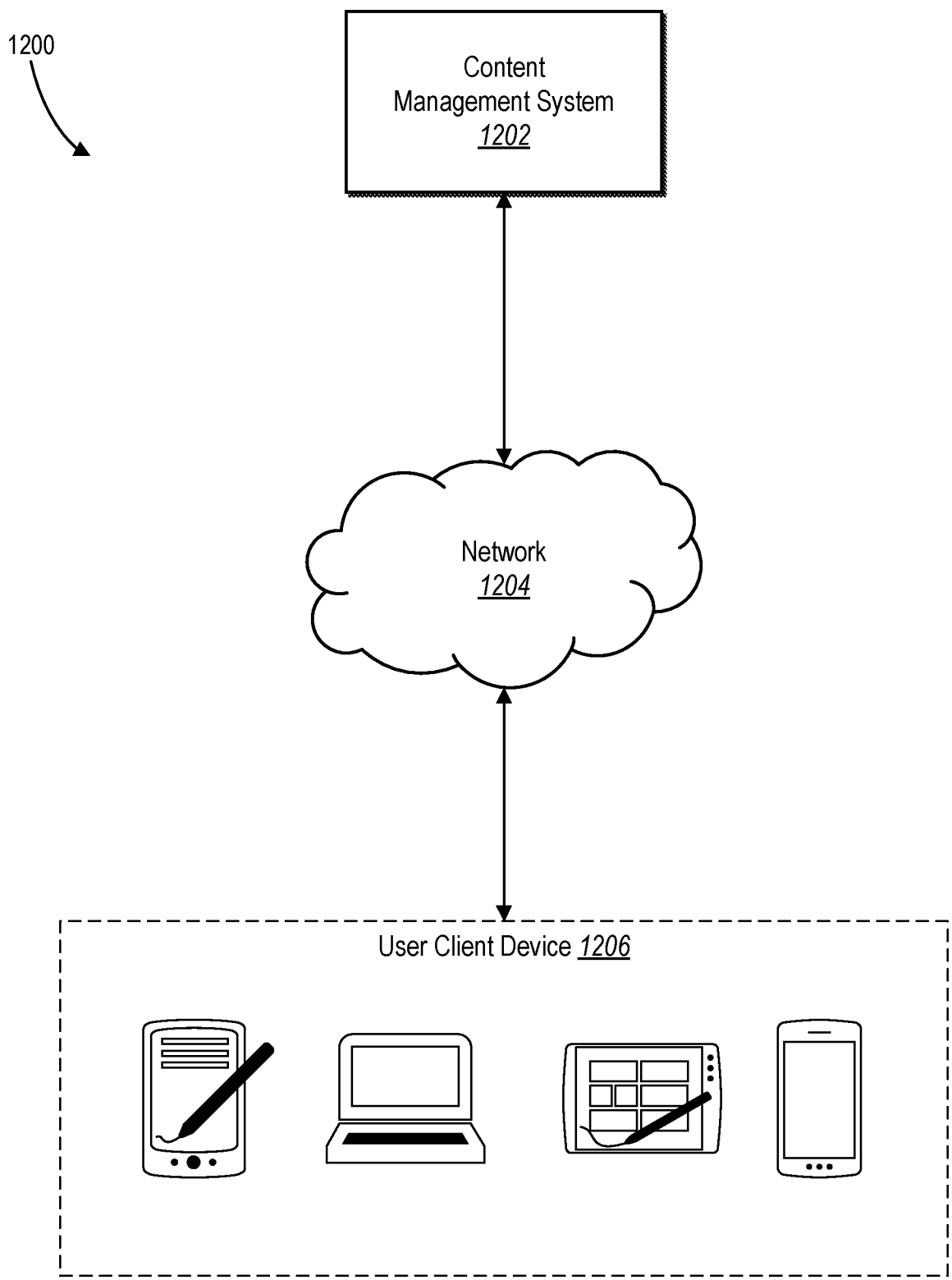
FIG. 12 illustrates an example environment of a networking system having the account backup system in accordance with one or more embodiments.

FIG. 12 is a schematic diagram illustrating environment 1200 within which one or more implementations of the account backup system 102 can be implemented. For example, the account backup system 102 may be part of a content management system 1202 (e.g., the content management system 106). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, at a content management system, authorization to access data associated with a user account on a third-party system;
   based on the authorization to access the data from the third-party system, establishing a data transfer from data storage of the third-party system to store an initial data instance of the data associated with the user account on the third-party system within data storage of the content management system;
   detecting a modification to the data associated with the user account on the third-party system; and
   in response to detecting the modification, generating an updated data instance by updating the initial data instance within the data storage of the content management system to reflect the modification to the data associated with the user account on the third-party system.

2. The method of claim 1, wherein establishing the data transfer from the data storage of the third-party system comprises:
   utilizing an application programming interface to receive the data associated with the user account from the data storage of the third-party system; and
   generating the initial data instance to mirror, within the data storage of the content management system, the data associated with the user account at the third-party system.

3. The method of claim 1, wherein detecting the modification to the data associated with the user account on the third-party system comprises determining that at least a threshold amount of user account data has been modified at the third-party system.

4. The method of claim 1, further comprising establishing an additional data transfer to the data storage of the third-party system to restore the data associated with the user account at the third-party system from the updated data instance at the content management system.

5. The method of claim 1, further comprising providing, for display on a client device, an account backup interface comprising selectable elements for managing data instances stored within the data storage of the content management system for a plurality of user accounts associated with respective third-party systems and corresponding to an account within the content management system.

6. The method of claim 1, further comprising:
   receiving a content item via the data transfer from the data storage of the third-party system to the data storage of the content management system; and
   in response to receiving the content item, automatically distributing the content item to one or more additional third-party systems associated with an account of the content management system.

7. The method of claim 1, further comprising:
   receiving, via a client device, a user interaction modifying a content item stored within the data storage of the content management system and received via the data transfer from the third-party system; and
   based on the user interaction, providing an indication to the third-party system to update the data associated with the user account to reflect changes resulting from the user interaction modifying the content item at the content management system.

8. A system comprising:
at least one processor; and
a non-transitory computer-readable medium comprising instructions that, when executed by the at least one processor, cause the system to:
receive, at a content management system, authorization to access data associated with a user account hosted by a third-party system;
based on the authorization to access the data from the third-party system, establish a data transfer from data storage of the third-party system to store an initial data instance of the data associated with the user account hosted by the third-party system within data storage of the content management system; and
in response to detecting a modification to the data at the third-party system, generate an updated data instance by updating the initial data instance within the data storage of the content management system to reflect the modification to the data associated with the user account hosted by the third-party system.

9. The system of claim 8, further comprising instructions that, when executed by the at least one processor, cause the system to establish the data transfer from the data storage of the third-party system by:
utilizing an application programming interface to receive the data associated with the user account from the data storage of the third-party system; and
generating the initial data instance to mirror, within the data storage of the content management system, the data associated with the user account hosted by the third-party system.

10. The system of claim 8, further comprising instructions that, when executed by the at least one processor, cause the system to detect the modification to the data associated with the user account on the third-party system by determining that at least a threshold amount of user account data has been modified at the third-party system.

11. The system of claim 8, further comprising instructions that, when executed by the at least one processor, cause the system to establish an additional data transfer to the data storage of the third-party system to restore the data associated with the user account at the third-party system from the updated data instance at the content management system.

12. The system of claim 8, further comprising instructions that, when executed by the at least one processor, cause the system to provide, for display on a client device, an account backup interface comprising selectable elements for managing data instances stored within the data storage of the content management system for a plurality of user accounts associated with respective third-party systems and corresponding to an account within the content management system.

13. The system of claim 8, further comprising instructions that, when executed by the at least one processor, cause the system to:
receive a content item via the data transfer from the data storage of the third-party system to the data storage of the content management system; and
in response to receiving the content item, automatically distribute the content item to one or more additional third-party systems associated with an account of the content management system.

14. The system of claim 8, further comprising instructions that, when executed by the at least one processor, cause the system to:
receive, via a client device, a user interaction modifying a content item stored within the data storage of the content management system and received via the data transfer from the third-party system; and
based on the user interaction, provide an indication to the third-party system to update the data associated with the user account to reflect changes resulting from the user interaction modifying the content item at the content management system.

15. A non-transitory computer-readable medium comprising instructions that, when executed by at least one processor, cause the at least one processor to:
receive, at a content management system, authorization to access user account data maintained by a third-party system;
based on the authorization to access the user account data maintained by the third-party system, establish a data transfer from data storage of the third-party system to store an initial data instance as a backup of the user account data maintained by the third-party system within data storage of the content management system;
detect a modification to the user account data maintained by the third-party system; and
in response to detecting the modification, generate an updated data instance by updating the initial data instance within the data storage of the content management system to reflect the modification to the user account data maintained by the third-party system.

16. The non-transitory computer-readable medium of claim 15, further comprising instructions that, when executed by the at least one processor, cause the at least one processor to establish the data transfer from the data storage of the third-party system by:
utilizing an application programming interface to receive the user account data from the data storage of the third-party system; and
generating the initial data instance to mirror, within the data storage of the content management system, the user account data maintained by the third-party system.

17. The non-transitory computer-readable medium of claim 15, further comprising instructions that, when executed by the at least one processor, cause the at least one processor to detect the modification to the user account data maintained by the third-party system by determining that at least a threshold amount of the user account data has been modified at the third-party system.

18. The non-transitory computer-readable medium of claim 15, further comprising instructions that, when executed by the at least one processor, cause the at least one processor to establish an additional data transfer to the data storage of the third-party system to restore the user account data maintained by the third-party system from the updated data instance at the content management system.

19. The non-transitory computer-readable medium of claim 15, further comprising instructions that, when executed by the at least one processor, cause the at least one processor to provide, for display on a client device, an account backup interface comprising selectable elements for managing data instances stored within the data storage of the content management system for a plurality of user accounts associated with respective third-party systems and corresponding to an account within the content management system.

20. The non-transitory computer-readable medium of claim 15, further comprising instructions that, when executed by the at least one processor, cause the at least one processor to:

receive a content item via the data transfer from the data storage of the third-party system to the data storage of the content management system; and in response to receiving the content item, automatically distribute the content item to one or more additional third-party systems associated with an account of the content management system.

\* \* \* \* \*